Patented Jan. 22, 1929.

1,699,671

UNITED STATES PATENT OFFICE.

WILHELM MÜLLER AND ERNST APPENZELLER, OF LUDWIGSHAFEN-ON-THE-RHINE, GERMANY, ASSIGNORS TO GRASSELLI DYESTUFF CORPORATION, OF NEW YORK, N. Y., A CORPORATION OF DELAWARE.

4'-HALOGEN-2-BENZOYLBENZOIC ACID INTERMEDIATES.

No Drawing. Application filed December 30, 1927, Serial No. 243,763, and in Germany March 12, 1927.

The present invention relates to the production of intermediate products in the manufacture of 4'-halogen-2-benzoylbenzoic acids from phthalic anhydrid, monohalogenbenzene and anhydrous aluminium chlorid.

We have found that aluminiferous intermediate products of 4'-halogen-2-benzoylbenzoic acids are obtained in a remarkably smooth and simple manner when mixing phthalic anhydrid, monohalogenbenzene and anhydrous aluminium chlorid in approximately molecular proportions, preferably in a finely comminuted condition, and slowly warming the oily product first obtained to temperatures between about 40° and 200° C. until practically no more hydrogen chlorid gas is evolved. The hydrogen chlorid gas is preferably sucked off or removed by passing a current of a dry gas, for example air over the reaction product. A foamy, blown up, brittle mass is obtained of a compound probably containing one molecule of phthalic anhydrid, one molecule of monohalogenbenzene and one molecule of $Al_2Cl_6$ from which one molecule of hydrogen chlorid is split off. The said foamy mass may be converted in any known manner, for instance by introducing it into dilute acid, into 4'-halogen-2-benzoylbenzoic acid.

The following example will further illustrate the invention which, however, is not limited thereto. The parts are by weight.

Example.

In an iron vessel provided with a stirrer 160 parts of monochlorbenzene, 200 parts of phthalic anhydrid and 360 parts of anhydrous aluminium chlorid are stirred at room temperature until a brown oily mass is obtained. The solid components are suitably comminuted before use. The order in which the components are mixed is irrelevant. The oily reaction product is drawn off onto drying plates and slowly heated to between 80° and 100° C. in a drier, while drawing off the hydrogen chlorid by the aid of a vacuum or a current of gas, until the reaction is complete. A foamy, blown up, brittle mass is obtained which, when introduced for instance into dilute acid, is converted into 4'-chlor-2-benzoyl-benzoic acid.

The reaction may also be carried out continuously, for example on a moving band forming a long trough.

What we claim is:

1. A process for producing aluminiferous intermediate products of 4'-halogen-2-benzoylbenzoic acids which consists in mixing phthalic acid anhydrid, monohalogenbenzene and anhydrous aluminium chlorid in approximately molecular proportion and slowly warming the oily reaction product to between about 40° and 200° C. until the evolution of hydrogen chlorid ceases.

2. The process of producing an aluminiferous intermediate product of 4'-chlor-2-benzoylbenzoic acid which consists in mixing 200 parts of phthalic anhydrid, 360 parts of anhydrous aluminium chlorid, both in a finely comminuted condition, and 160 parts of monochlorbenzene, and slowly heating the oily reaction product to between about 80° and 100° C. until the evolution of hydrogen chlorid ceases, while removing the hydrogen chlorid gas.

3. As new articles of manufacture, the condensation products of phthalic anhydrid, monohalogenbenzene and anhydrous aluminium chlorid in the form of foamy, brittle, blown up masses which correspond probably to the formula $(C_8H_4O_3.Al_2Cl_6.C_6H_5Hal) - HCl$, and are obtainable by mixing the said components in approximately molecular proportion and slowly warming the oily product first obtained to between about 40° and 200° C.

4. As a new article of manufacture, the condensation product of phthalic anhydrid, monochlorbenzene and anhydrous aluminium chlorid in the form of a foamy, brittle, blown up mass, which corresponds probably to the formula $(C_8H_4O_3.Al_2Cl_6.C_6H_5Cl) - HCl$ and is obtainable by mixing the said components in approximately molecular proportion and slowly warming the oily product first obtained to between about 80° and 100° C.

In testimony whereof we have hereunto set our hands.

WILHELM MÜLLER.
ERNST APPENZELLER.